United States Patent [19]

Parker

[11] 4,276,566

[45] Jun. 30, 1981

[54] CIRCUIT FOR INHIBITING RADIO FREQUENCY INTERFERENCE IN A TELEVISION RECEIVER

[75] Inventor: Robert P. Parker, Indianapolis, Ind.

[73] Assignee: RCA Corporation, New York, N.Y.

[21] Appl. No.: 65,453

[22] Filed: Aug. 10, 1979

[51] Int. Cl.³ .................. H04N 5/14; H04N 5/21
[52] U.S. Cl. ........................... 358/170; 358/167; 358/39; 358/36
[58] Field of Search ............. 358/170, 167, 184, 36, 358/39, 74, 243; 307/237; 328/171

[56] References Cited

U.S. PATENT DOCUMENTS

| | | | |
|---|---|---|---|
| 2,861,180 | 11/1958 | Sonnenfeldt | 358/36 |
| 2,914,606 | 11/1959 | Loughlin | 358/21 |
| 3,557,305 | 1/1971 | Dann | 358/170 |
| 3,980,815 | 9/1976 | Kaneko | 358/170 |
| 3,983,576 | 9/1976 | Shanley et al. | 358/38 |
| 4,091,420 | 5/1978 | Omori et al. | 358/184 |
| 4,158,852 | 6/1979 | Harlan | 358/37 |

OTHER PUBLICATIONS

Towers, *Transistor Television Receivers*, John F. Rider Publishing Co., New York, pp. 72–73, 1963.

*Primary Examiner*—John C. Martin
*Attorney, Agent, or Firm*—Eugene M. Whitacre; William H. Meagher; Ronald H. Kurdyla

[57] ABSTRACT

In a television receiver comprising a video output stage for supplying amplified image representative video signals to a color kinescope, a signal clipping network is included for inhibiting video signal amplitude transitions otherwise capable of inducing radio frequency interference (RFI) by causing the video output stages to change between saturated and nonsaturated conductive states. The network is disposed in a low level video signal processing channel of the receiver, and serves to clip peak transient signal amplitude excursions likely to induce RFI in the video output stage. The clipping network exhibits a "floating" clipping level to account for variations in the black reference level of the video signal, and therefore variations in the peak level of transients likely to induce RFI, due to unit-to-unit tolerance variations of preceding signal processing circuits. A low pass filter is coupled between the clipping network and the video output stage for attenuating high frequency signals above the band of frequencies of signals normally processed by the video processing channel.

1 Claim, 1 Drawing Figure

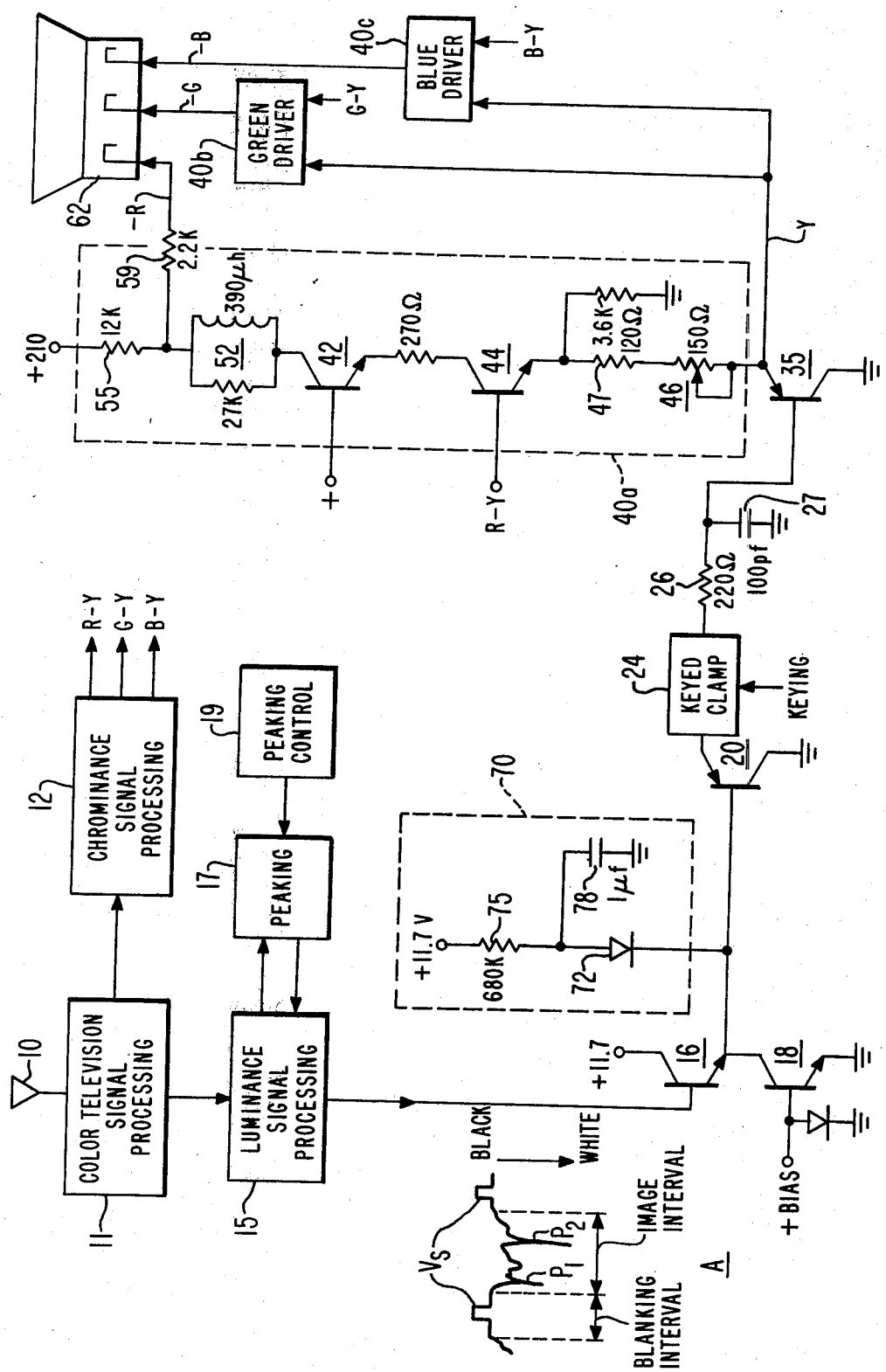

CIRCUIT FOR INHIBITING RADIO FREQUENCY INTERFERENCE IN A TELEVISION RECEIVER

This invention concerns an arrangement for inhibiting the generation of radio frequency interference (RFI) in a monochrome or color television receiver includng a kinescope driver stage for supplying amplified, high level video signals to an image reproducing kinescope.

Video output kinescope driver stages in a color television receiver, for example, are typically required to process wide bandwidth video signals (e.g., zero Hertz to 3–4 MHz) of large amplitude (e.g., 175 volts peak-to-peak). The video output stages can undesirably represent a potential source of RFI, particularly when caused to change rapidly between saturated and non-saturated conductive states in response to transient video signal conditions during image intervals. This manner of operation, typically produced in response to rapid whitegoing image signal transitions, is accompanied by rapid changes in the high levels of current and voltage at the video output stages. These rapid changes in turn produce significant levels of radio frequency (RF) components, particularly in the low VHF television signal frequency band between approximately 50 MHz and 100 MHz. The RF components generated in this manner represent a source of signal interference, and are "received" by high frequency signal processing circuits included elsewhere in the receiver. The interfering signals can be "received" by high frequency signal processing networks including unshielded tuner and IF signal processing stages for example, as well as through a receiver antenna input to which an unshielded, unbalanced antenna is attached.

Since the internally radiated RFI signals are delayed slightly relative to the normal television signal, the effect of the RFI signals is seen on a displayed image as a narrow band of random phase scintillating dots or flecks immediately to the right-hand edge of the image. This image impairing effect is disturbing to a viewer and should be avoided.

Techniques are known for preventing the kinescope driver stages from saturating in response to large signals, to thereby inhibit the production of RFI signals. In accordance with one technique, each video driver stage is arranged to exhibit an expanded dynamic operating range capable of easily accepting the full range of video signal amplitudes without saturating. However, the expanded dynamic range wastes power and reduces the reliability of the driver stages. Also, conduction from the control grid electrode to the cathode electrode of the kinescope can be relied on as an increased non-linear load to "clamp" the outputs of the kinescope drivers before saturation is reached.

Other known approaches employ either a locally generated automatic grain control (AGC) signal or noise spectrum detectors to limit the amount of signal peaking provided under weak signal conditions, when noise impulses are likely to represent a significant component of the video signal and when signal processing stages are typically operating with high gain in response to the AGC signal. These approaches are undesirably complicated or costly, however.

U.S. Pat. No. 3,983,576—Shanley, et al. discloses a color television receiver including a transversal equalizer network in a signal peaking path of the luminance channel for providing signal amplitude preshoots and overshoots to sharpen a displayed image by peaking edge transitions of the luminance signal. The equalizer network includes "compression" diodes in the luminance peaking signal path for compressing overshoots in the white direction of a black-to-white signal edge transition. The operation of the compression diodes decreases the likelihood that the kinescope driver stages will be driven into saturation, but is not sufficient to assure that the generation of RFI components will be reduced to an acceptable minimum.

Thus it is herein recognized as desirable to provide an uncomplicated, economical arrangement capable of inhibiting or reducing to an acceptable minimum RFI components otherwise generated by operation of the kinescope driver stages between saturated and non-saturated conductive states in response to transient peak image signal components. It is also recognized as advantageous to accomplish this result in a manner which considers possible variations in the level of the peak components with variations in the blanking reference level of the video signal, as may be caused by circuit tolerance effects, for example.

Apparatus according to the present invention is included in a television receiver for processing a wideband video signal occupying a prescribed frequency band and containing a blanking reference level. The blanking reference level occurs during image blanking intervals of the video signal, and is undesirably subject to variations. The receiver includes a video signal processing channel including an intermediate low level signal processing path, an image reproducing kinescope with an intensity control electrode, and a network for coupling signals from the intermediate video path to the kinescope intensity control electrode. The coupling network comprises a video output stage for supplying high level image representative video output signals to the kinescope intensity control electrode. The receiver also includes a circuit disposed in the intermediate video signal path for clipping transient peak amplitude excursions of the video signal during image intervals. The clipping circuit comprises a normally nonconductive unidirectional current conducting threshold conduction device coupled between the intermediate signal path and a charge storage capacitance, and a direct current conduction network. The direct current conduction network includes an impedance coupled to the capacitance and defining therewith a time constant which is long relative to the time of a horizontal image interval of the video signal, for determining a time varying direct current charge on the capacitance when the threshold device is nonconductive. The threshold device conducts to clip transient peak amplitude excursions of low level video signals during image intervals, when the threshold conduction level of the threshold device is exceeded in response to the level of charge then appearing on the charge storage capacitance. This clipping action serves to substantially preclude rapid changes between saturated and non-saturated conductive states in the video output stage in response to transient peak amplitude excursions of the video signal, whereby undesired high frequency interference signals significantly above the prescribed video signal frequency band, otherwise produced by the rapid changes in conductive state in the video output stage, are minimized. Also included is a low pass filter coupled between an output of the clipping circuit and an input of the video output stage, for attenuating signal frequencies above the prescribed frequency band.

The drawing illustrates a portion of a color television receiver partly in block diagram form and partly in schematic circuit diagram form, including a circuit arranged according to the principles of the present invention.

In the drawing, a composite color television signal including chrominance and wide bandwidth luminance components is received by an antenna 10 and afterwards processed by a color television signal processor 11. Signal processor 11 includes RF and intermediate frequency signal processing stages, detector stages, and frequency separation network such as a comb filter for separating the luminance and chrominance components from the composite television signal.

The chrominance component is supplied from an output of unit 11 to a chrominance signal processing unit 12, which produces R-Y, G-Y and B-Y color difference signals. The luminance component is supplied from another output of unit 11 to a luminance signal processing unit 15 including signal amplification and peaking circuits for accentuating signal amplitude transitions to improve picture detail. In this example, processor 15 includes a video signal processing integrated circuit type CA3144, available from the Solid State Division of RCA Corporation, Somerville, New Jersey. Associated with unit 15 is a horizontal signal peaking network 17 including a peaking control 19 (e.g., a potentiometer) arranged in a luminance peaking signal path. Network 17, 19 serves to emphasize or peak detail information so as to enhance picture detail information, and may comprise an arrangement of the type disclosed in U.S. Pat. No. 3,983,576—Shanley, et al., or U.S. Pat. No. 4,041,531—Bingham. Processed luminance signals from unit 15 are coupled to succeeding networks in the luminance channel of the receiver via a circuit comprising a buffer transistor 16 and an associated source of substantially constant current (approximately one milliampere) including a transistor 18. This circuit is actually included within the aforementioned integrated circuit in unit 15, but is shown here to facilitate the description which follows. The collector-emitter path of transistor 18 normally provides a current path for emitter current of transistor 16 and base current of a buffer transistor 20.

The luminance signal coupled via transistor 16 is shown as a waveform A and includes periodic positive-going horizontal image synchronizing pulses ($V_s$) disposed on a blanking reference pedestal level (approximating a black level of a displayed image) during horizontal line blanking intervals (approximately 11 microseconds), and negative-going image signal information occurring during image intervals (approximately 52 microseconds) disposed between adjacent blanking intervals. The image information signal portion extends from a relatively positive black information level to a relative less positive white information level in a negative-going direction. The image interval also contains transient, peak amplitude excursions ($P_1$, $P_2$) in the white direction, as will be discussed subsequently.

The luminance signal from transistor 16 is coupled via buffer amplitude transistor 20 to a keyed clamping unit 24 which is keyed during the horizontal blanking intervals to clamp and blanking level of the luminance signal to a reference level. The clamped signal is filtered by a low pass filter network including a resistor 26 and a capacitor 27. The filtered luminance signal is then amplified by a PNP luminance driver transistor 35.

The amplified luminance signal appearing at an emitter output of driver transistor 35 is supplied to respective luminance signal inputs of red, green and blue kinescope driver stages 40a, 40b and 40c. The luminance signal is matrixed in each driver stage with the R-Y, G-Y and B-Y color difference signals also respectively supplied to these stages from unit 12, for producing amplified, high level color image representative signals -R, -G and -B at outputs of stages 40a, 40b, and 40c, respectively. These color signals are then utilized to separately drive cathode intensity control electrodes of a color kinescope 62. Since red signal driver stage 40a is similar to green signal driver stage 40b and blue signal driver stage 40c, only stage 40a is shown in circuit form and will be described in detail.

Red signal driver stage 40a comprises a matrix transistor 44 and a high voltage, common base video output amplifier transistor 42 arranged in cascode amplifier configuration. The R-Y color difference signal as applied to a base input of transistor 44 is matrixed in transistor 44 with the luminance signal supplied to an emitter input of transistor 44 from driver transistor 35 via an adjustable drive level control resistor 46 and a resistor 47. A red color representative signal produced by the matrixing action appears in high level amplified form, sufficient to supply appropriate signal drive to the red cathode electrode of kinescope 62, at the junction of a load resistor 55 and a network 52 in the collector output circuit of output transistor 42.

Red driver stage 40a, and output transistor 42 in particular, is biased such that it is subject to change between saturated and non-saturated conductive states in response to large peak amplitude excursions of signals translated by this stage during image intervals. Rapid, transient peak excursions of signals processed by stage 40a can be sufficient to cause output transistor 42 to change rapidly between saturated and non-saturated states, with the attendant undesirable effect of generating high level RFI components which are then radiated from driver stage 40a and are likely to be "received" by other portions of the receiver, as mentioned earlier. Such transient signal excursions are predominately associated with the relatively wide bandwidth luminance component of the video output color signals developed by each of the output driver stages.

In this example, collector current through each output driver transistor (e.g., transistor 42) under black level conditions is approximately one milliampere, whilea typical current produced under high level white conditions is of the order of fifteen milliamperes. Driver saturation current is of the order of twenty milliamperes. Similarly, the collector voltage of the video output transistors can vary between approximately +190 volts (relative to ground) under black level conditions, and +12 volts in the saturated conduction state. These levels of output voltage and current are several orders of magnitude greater than the voltage and current levels associated with the low level luminance processing circuits between transistor 16 and luminance driver transistor 35 in the luminance channel, and contribute to the production of significant levels of RFI when the output drivers are caused to conduct between saturated and non-saturaged states. RFI components can be radiated from several points in each of the video output stages (e.g., from points between the emitter output of luminance driver transistor 35 and the collector output circuits of each video output transistor such as transistor 42). However, significant amounts of RFI are predominantly radiated from the collector output nodes of the video output transistors.

The generation of the described RFI components is significantly reduced or eliminated by means of a peak white level signal clipping circuit 70 disposed in the low level luminance signal processing path between transistors 16 and 20. Circuit 70 includes a threshold conduction diode 72 coupled between the signal path and a charge storage filter capacitor 78, and a current resupply resistor 75 coupled between a source of positive DC potential (+11.7 volts) and capacitor 78 for replenishing charge discharged from capacitor 78 due to signal clipping action. Circuit 70 serves to clip (i.e., selectively limit) negative-going peak excursions of the luminance signal from transistor 16, including transient (low-duty cycle) peak white excursions capable of inducing RFI at the kinescope driver stages.

Peak white amplitude excursions of the luminance signal are clipped when the negative-going amplitude of the luminance signal is sufficient to forward bias diode 72 into conduction. The signal clipping level is equal to the voltage then appearing on capacitor 78, minus the offset voltage drop of diode 72 when conducting (approximately 0.6 volts). During the clipping interval, current flowing through diode 72 reduces the charge on capacitor 78, and flows to ground via the collector-emitter path of constant current source transistor 18. The relatively small maximum amount of current conducted by current source transistor 18 (approximately one milliampere) is sufficient in this example to assure that the charge on capacitor 78 is not depleted significantly during the clipping interval, and thereby assures that the clipping capability of network 70 is not impaired. Also, the recharging time constant (680 milliseconds) associated with resistor 75 and capacitor 78 is great relative to the duration of the horizontal line interval and to the duration of the short-duty cycle peak white transients capable of inducing RFI. The charge stored on capacitor 78 no longer increases via resistor 75 when the average current through resistor 75 equals the average current conducted by diode 72.

More specifically, with regard to luminance signal waveform A, capacitor 78 is charged to some level (e.g., +3.6 volts) at the beginning of an image line interval. Peak white transient $P_1$ appears shortly after the beginning of the image interval and is clipped to approximately +3 volts (i.e., the voltage on capacitor 78 less the 0.6 volt offset voltage of diode 72). This clipping action reduces the charge on capacitor 78 somewhat via the current path including diode 72 and transistor 18. Diode 72 ceases conduction after the clipping interval, when the signal level and the level of charge on capacitor 78 are insufficient to maintain diode 72 in a forward biased state. The charge on capacitor 78 increases via resistor 75 during the interval between transient $P_1$ and the next transient $P_2$. During this interval the charge on capacitor 78 and the signal level are insufficient to forward bias diode 72, whereby clipping circuit 70 is inactive. Clipping action again occurs with respect to transient $P_2$, which is of sufficient magnitude to forward biase diode 72. In this instance transient $P_2$ is clipped to a level equal to the voltage then appearing on capacitor 78, less the offset voltage of diode 72.

Thus network 70 will operate to clip peak white-going signals which are sufficiently negative to render diode 72 conductive. Also, the level at which clipping occurs is a function of both the level of charge on capacitor 78 and the level of the luminance signal at a given time, whereby the clipping level is therefore not fixed at a predetermined value, but rather corresponds to a "floating" level. This feature of circuit 70 is advantageous, since it permits circuit 70 to clip peak signal excursions capable of inducing RFI in a system where the blanking or black reference level of the video signal sensed by circuit 70 is likely to shift. Such a shift can be caused by unti-to-unit variations in the circuit tolerances of the signal processing circuits within processor 15. An explanatory example follows.

Assume in a first instance that a nominal blanking or black reference level of the luminance signal from transistor 16 occurs at +4.4 volts, and that peak image signal transients capable of inducing RFI at the kinescope driver stages exhibit an amplitude of +2 volts and less. Thus RFI can be inhibited by clipping peak amplitude excursions below +2 volts.

Circuit tolerance effects can cause the black reference level to shift by ±0.5 volts from unit-to-unit, with an attendant shift in the level of peak amplitude excursions capable of inducing RFI. If in a second instance tolerance effects cause the black reference level to increase by +0.5 volts to +4.9 volts for example, the level of peak amplitude excursions capable of inducing RFI increases by a corresponding amount to +2.5 volts. Thus, if clipping circuit 70 were arranged to clip signals below a fixed level of +2.0 volts such as in the first instance, signals such as those in the second instance between +2.5 volts and the +2.0 volt fixed clipping level would not be clipped. Accordingly, unclipped peak transient signals in the latter range would undesirably induce RFI. As a further example, if tolerance effects cause the black level to decrease by 0.5 volts to +3.9 volts, a clipping level fixed at +2.0 volts would have the undesirable effect of clipping signal information not associated with the generation of RFI. The likelihood of these undesirable effects occurring is minimized by the "floating" clipping level of circuit 70.

It is noted that, under some conditions, the clipping action of circuit 70 may produce significant amounts of high frequency transients, representing a form of radio frequency interference when translated and radiated by the video output stages. However, any such high frequency transients are significantly attenuated by low pass filter network 26, 27 in the low level luminance path. This low pass filter attenuates signal frequencies above approximately seven magahertz, and also serves to attenuate unwanted high frequency transients which may be produced by preceding luminance signal processing circuits such as circuits within unit 15. In this example, each of the kinescope driver stages exhibits a limited frequency bandwidth (e.g., due to the filtering action of collector-base feedback capacitance associated with each of the video output devices such as transistor 42). As a practical matter, however, the mechanism by which such bandwidth limiting occurs is incapable of inhibiting or significantly reducing RFI developed as a consequence of either kinescope driver operation between saturated and nonsaturated states, or clipping action.

The described clipping circuit arrangement represents an uncomplicated, inexpensive means for successfully reducing the described RFI to an acceptable minimum, and permits the video output stages to be biased for efficient operation in both color and monochrome television receivers.

What is claimed is:

1. In a television receiver for processing a wideband video signal occupying a prescribed frequency band and containing a blanking reference level occurring during image blanking intervals of said video signal and being undesirably subject to variations, said receiver including a video signal processing channel including an intermediate low level video signal processing path; an image reproducing kinescope having an intensity control electrode; and means for coupling signals from said intermediate video path to said kinescope intensity control electrode, said coupling means including a video output stage for supplying high level image representative video output signals to said kinescope intensity control electrode; apparatus comprising:

means disposed in said intermediate video signal path for clipping transient peak amplitude excursions of said video signal during image intervals of said video signal, said clipping means including a charge storage capacitance;

normally nonconductive unidirectional current conducting threshold conduction means coupled between intermediate signal path and said capacitance;

direct current conducting means including an impedance coupled to a direct current potential and said capacitance, said impedance and capacitance defining a time constant which is long relative to the time of a horizontal image interval of said video signal for determining a time varying direct current charge on said capacitance when said threshold means is nonconductive; wherein said threshold means is rendered conductive to clip transient peak amplitude excursions of low level video signals during said image intervals when the threshold conduction level of said threshold means is exceeded in response to the level of said wideband video signal and the level of charge then appearing on said charge storage means, to substantially preclude rapid changes between saturated and nonsaturated conductive states in said video output stage in response to said transient peak amplitude excursions of said video signal, whereby undesired high frequency interference signals significantly above said prescribed frequency band otherwise produced by said rapid changes are minimized; and low pass filter means coupled between an output of said clipping means and an input of said video output stage, for attenuating signal frequencies above said prescribed frequency band; wherein said intermediate signal path includes video signal processing means including a signal output network with an associated output current path for conducting a substantially constant current; and said threshold conduction means is coupled to said output current path for enabling current conducted by said threshold means to flow through said current path, thereby limiting the magnitude of current conducted by said threshold means.

* * * * *